United States Patent [19]

Nonaka et al.

[11] Patent Number: 5,732,293
[45] Date of Patent: Mar. 24, 1998

[54] ELECTRONIC CONTROLLED CAMERA WITH COLOR CORRECTION FUNCTION

[75] Inventors: Osamu Nonaka, Sagamihara; Takao Nishida, Urawa; Toshiaki Ishimaru, Hino, all of Japan

[73] Assignee: Olympus Optical Co., Ltd., Tokyo, Japan

[21] Appl. No.: 714,225

[22] Filed: Sep. 16, 1996

[30] Foreign Application Priority Data

Sep. 22, 1995 [JP] Japan .................... 7-244133

[51] Int. Cl.⁶ .................................. G03B 15/03
[52] U.S. Cl. .................. 396/157; 396/56; 396/155
[58] Field of Search ....................... 396/106, 155, 396/157, 179, 56

[56] References Cited

U.S. PATENT DOCUMENTS

| | | | |
|---|---|---|---|
| 4,316,659 | 2/1982 | Daniels | 396/179 |
| 4,358,186 | 11/1982 | Johnson et al. | 396/155 |
| 4,894,678 | 1/1990 | Farrington et al. | 396/157 |
| 4,989,093 | 1/1991 | Kaneko . | |
| 4,998,128 | 3/1991 | Coltman et al. | 396/157 |
| 5,016,039 | 5/1991 | Sosa et al. . | |
| 5,051,768 | 9/1991 | Harrison | 396/157 |
| 5,117,252 | 5/1992 | Ellwood et al. | 396/157 |
| 5,124,739 | 6/1992 | Kelleher | 396/106 |
| 5,155,581 | 10/1992 | Tanaka et al. . | |

FOREIGN PATENT DOCUMENTS

| | | |
|---|---|---|
| 63-129797 | 6/1988 | Japan . |
| 1-293329 | 11/1989 | Japan . |
| 2-106727 | 4/1990 | Japan . |

*Primary Examiner*—Russell E. Adams
*Attorney, Agent, or Firm*—Frishauf, Holtz, Goodman, Langer & Chick

[57] ABSTRACT

An electronic flash illuminates an object. A first photometric unit measures a visible light component of ambient light of the object. A second photometric unit measures an infrared light component of the ambient light of the object. A determining unit determines the ratio between the visible light component measured by the first photometric unit and the infrared light component measured by the second photometric unit. On the basis of the ratio determined by the determining unit, a light emission determining unit determines whether the electronic flash is to be made emit light.

16 Claims, 12 Drawing Sheets

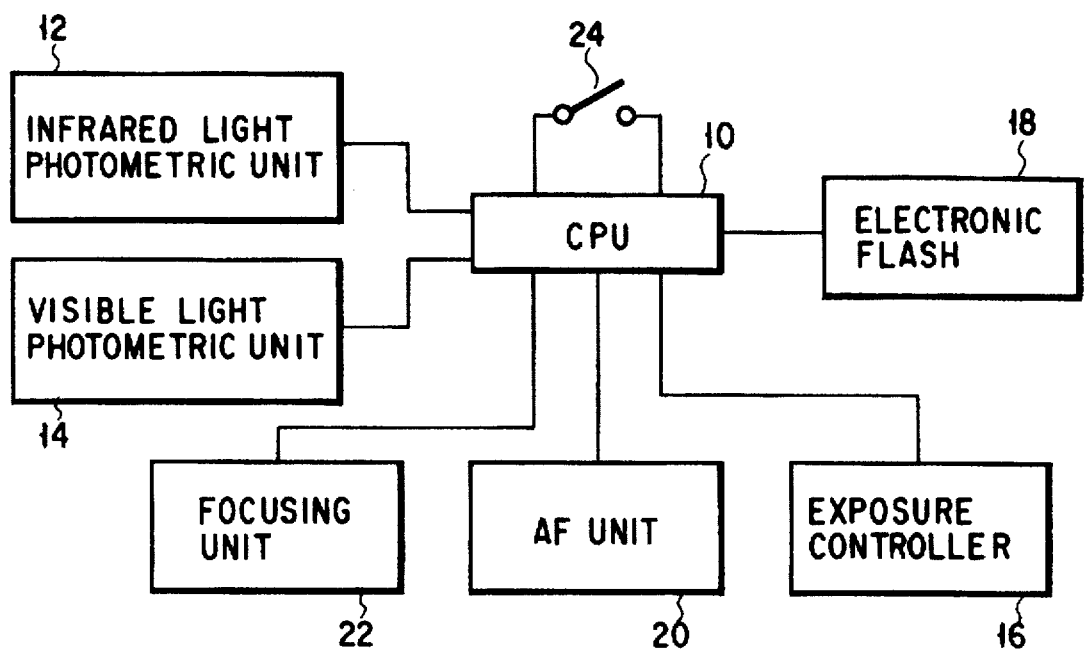
F I G. 1
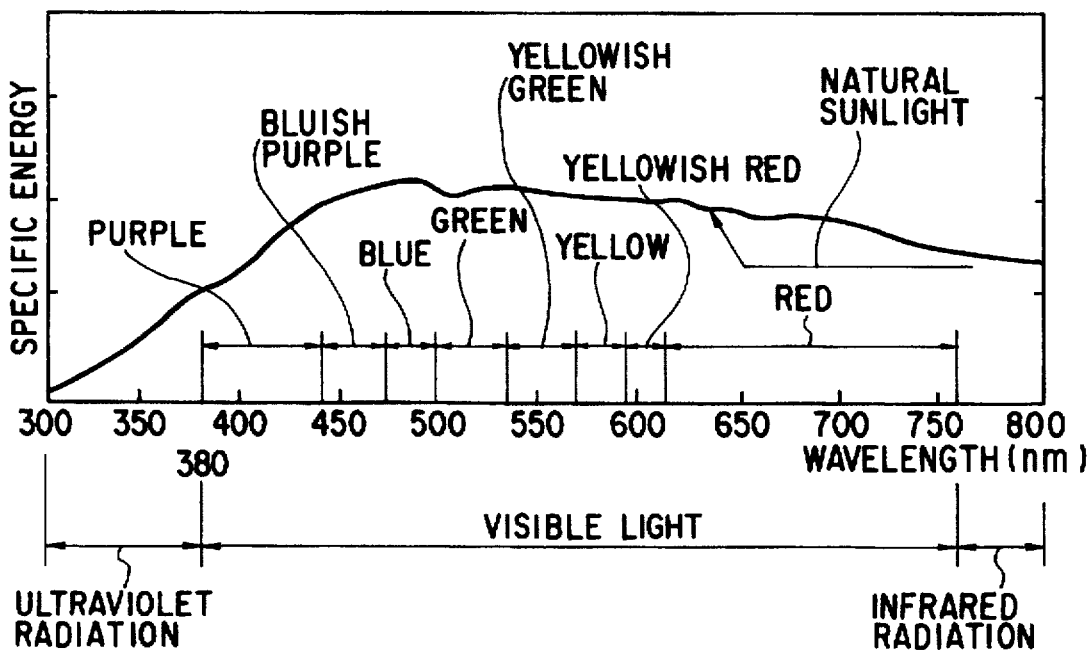
F I G. 2A

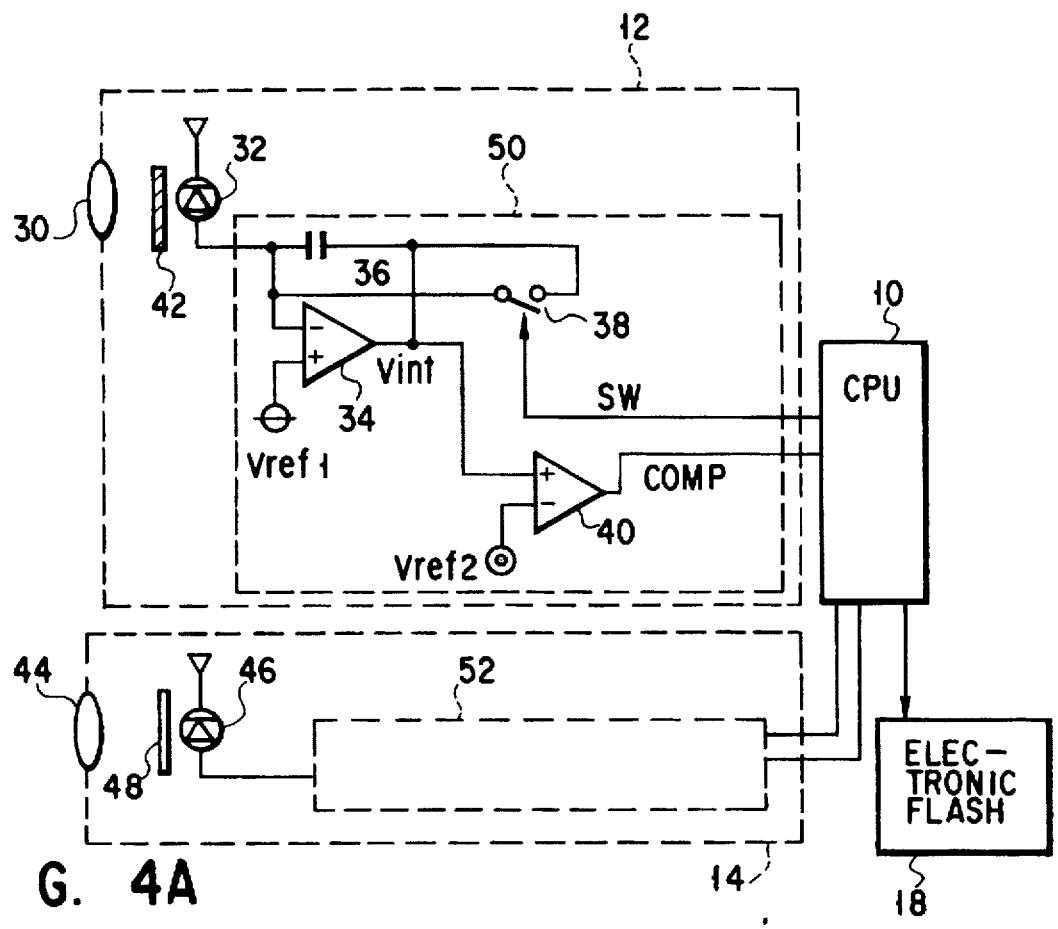
F I G. 4A
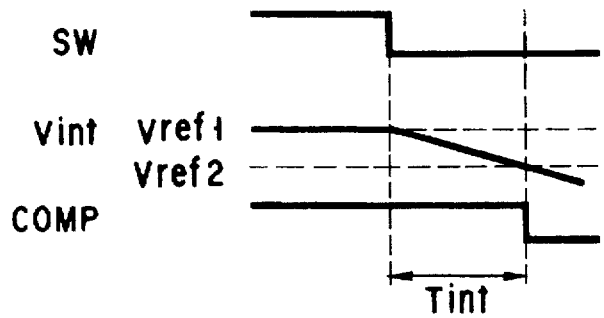
F I G. 4B
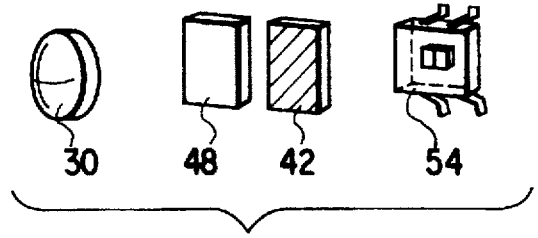
F I G. 4C

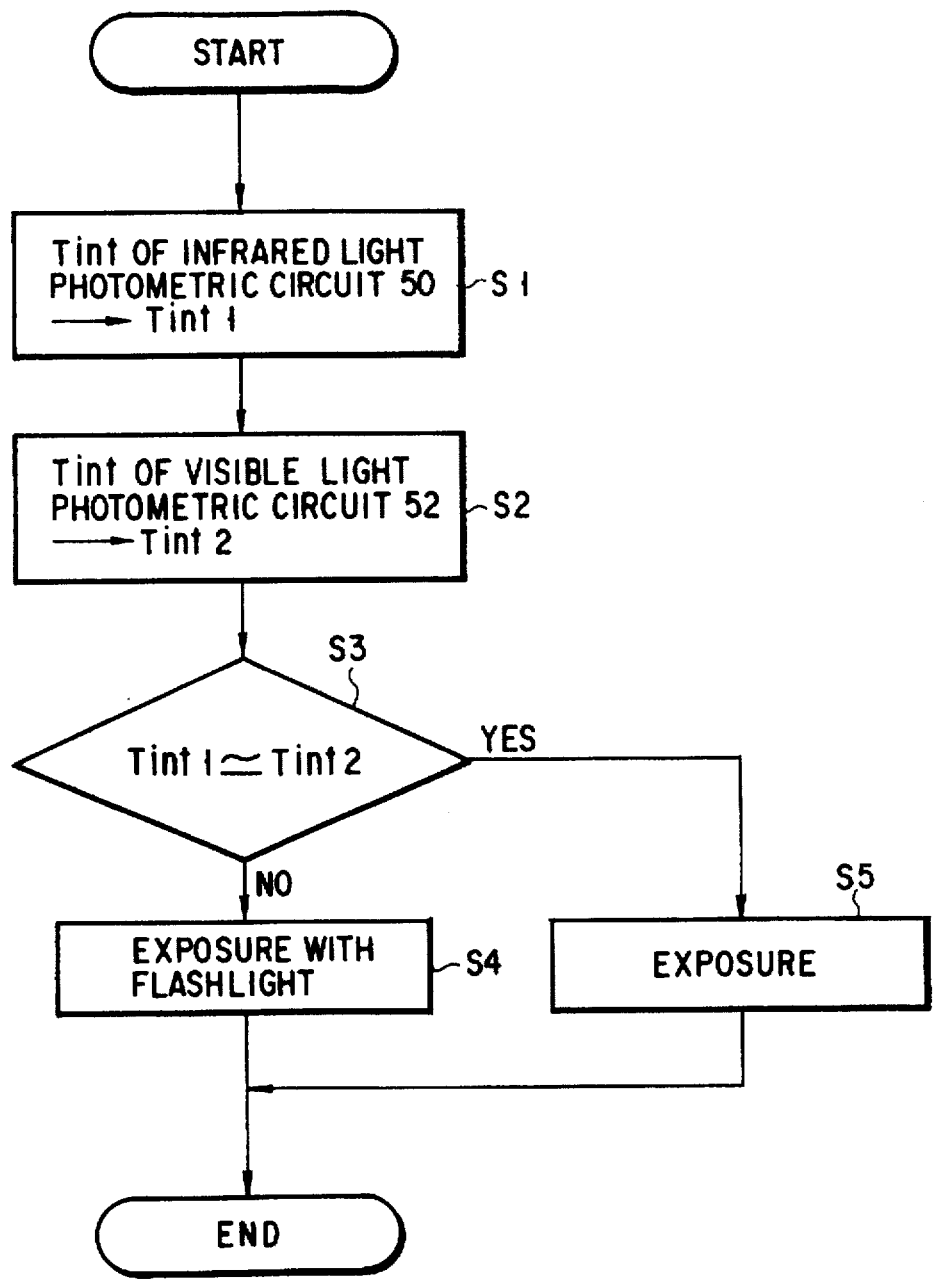
F I G. 5

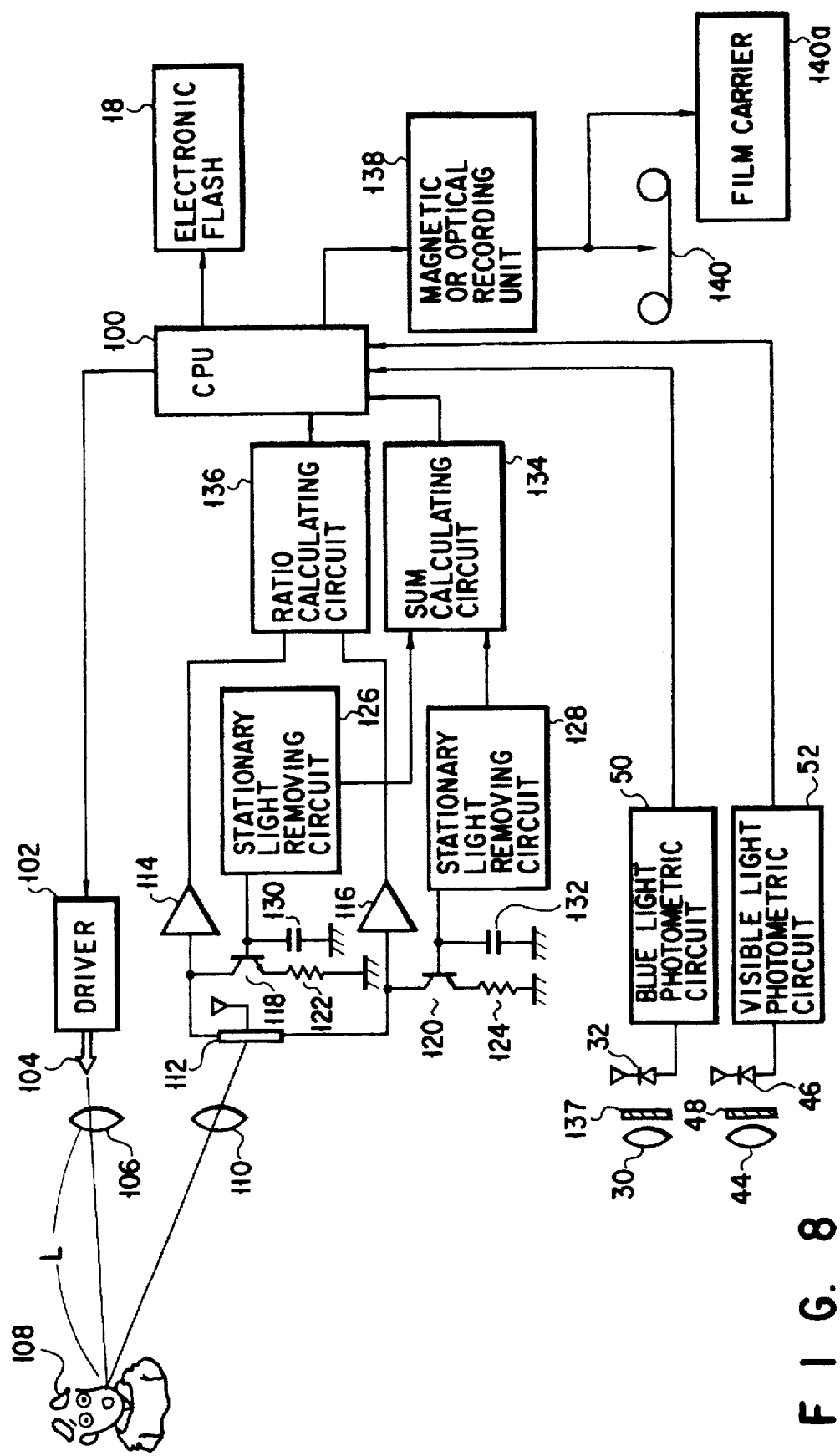
F I G. 8

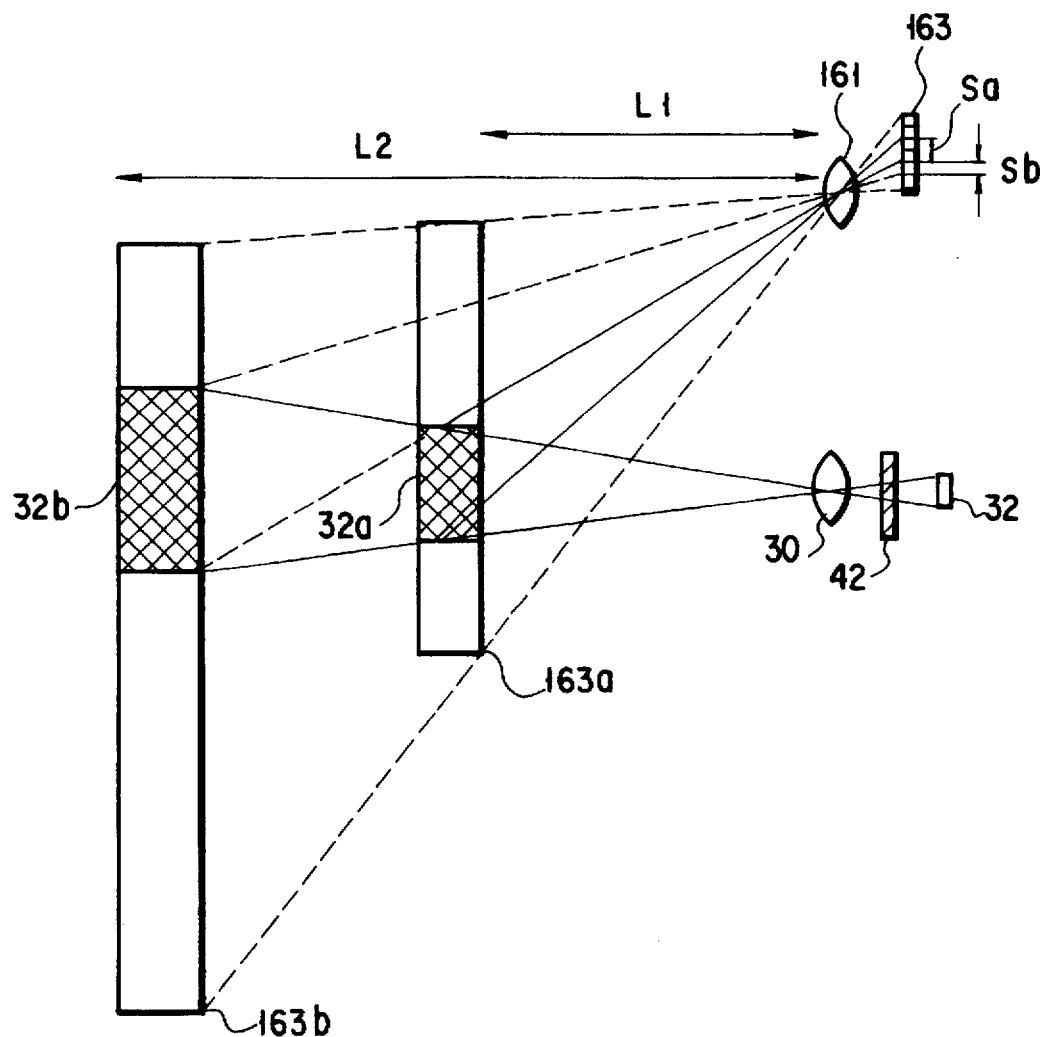
F I G. 12

ELECTRONIC CONTROLLED CAMERA WITH COLOR CORRECTION FUNCTION

BACKGROUND OF THE INVENTION

1. Field of the Invention

The present invention generally relates to a camera and, more particularly, to an electronic controlled camera having a function of correcting the color balance and a function of writing color correction information used in printing performed after photographing.

2. Description of the Related Art

Generally, in the field of color photography, users who are unsatisfied with the color reproducibility of finished prints are increasing as automatic negative film printers in laboratories are becoming popular.

This is so because when a negative film is automatically printed by using an automatic printer, the printer cannot mechanically determine with which portion in the frame of the film the exposure or the color correction of printing is to be matched.

Especially in the case of a negative film in which an object illuminated with artificial light other than sunlight is photographed, the intrinsic wavelength component of the illumination is enhanced by automatic printing. This often results in prints with an unnatural tone of colors.

As an example, a negative film in which a person illuminated primarily by a fluorescent lamp is photographed readily poses a problem of so-called color fog in which the skin of the person is printed to be bluish by automatic printing, since the light from a fluorescent lamp has little red wavelength component. Consequently, many people are unsatisfied with the finished prints.

Although this color fog can be corrected by manual printing independent of automatic printing, the degree of color fog sometimes exceeds the correctable range of manual printing.

The conventional techniques by which this color fog is removed are cameras disclosed in, e.g., Jpn. Pat. Appln. KOKAI Publication Nos. 63-129797 and 2-106727 filed by the assignee of this application. These cameras irradiate flashlight having a spectral distribution close to that of sunlight if the cameras detect an artificial light source when performing photographing, thereby correcting the color balance of an object.

In order for the camera to detect an artificial light source, Jpn. Pat. Appln. KOKAI Publication No. 63-129797 uses a method which determines whether the light source is artificial light by detecting the frequency of light from the light source, i.e., the content of ripples in the light from the light source, since the use of, e.g., a color sensor complicates the arrangement.

Jpn. Pat. Appln. KOKAI Publication No. 2-106727 uses a method which determines whether the light source is artificial light by detecting the color temperature.

Also, Jpn. Pat. Appln. KOKAI Publication No. 1-293329 has disclosed a method by which, to perform color correction during printing, color correction information for correcting the color balance of an object is written in a storage portion of a film during photographing prior to the printing.

Unfortunately, when the content of ripples in the light from a light source is detected or the color temperature sensor is used as described in Jpn. Pat. Appln. KOKAI Publication Nos. 63-129797 and 2-106727, the scale of the processing circuit for the purpose increases accordingly. This not only complicates the arrangement but also increases the cost.

On the other hand, when the color correction information stored in the storage portion of a film is used to perform color correction during printing as described in Jpn. Pat. Appln. KOKAI Publication No. 1-293329, if the film is exposed only to a specific spectrum during photographing, no color correction can be performed because the degree of color fog exceeds the correctable range.

SUMMARY OF THE INVENTION

It is, therefore, an object of the present invention to provide a new and improved electronic controlled camera which can photograph even an object illuminated by artificial light in an appropriate color balance with a simple arrangement and provide prints with a high color reproducibility when printing is performed after photographing.

According to an aspect of the present invention, there is provided an electronic controlled camera comprising; an electronic flash for illuminating an object; first photometric means for measuring a visible light component of ambient light of the object; second photometric means for measuring an infrared light component of the ambient light of the object; determining means for determining a ratio between the visible light component measured by the first photometric means and the infrared light component measured by the second photometric means; and light emission determining means for determining based on the ratio determined by the determining means whether the electronic flash is to be made emit light.

Additional objects and advantages of the invention will be set forth in the description which follows, and in part will be obvious from the description, or may be learned by practice of the invention. The objects and advantages of the invention may be realized and obtained by means of the instrumentabilities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing the conceptional arrangement of an electronic controlled camera according to the present invention;

FIGS. 2A, 2B, and 2C are graphs showing the spectral distributions of different light sources;

FIG. 4A is a circuit diagram showing the arrangement of the major parts of an electronic controlled camera of the first embodiment according to the present invention;

FIG. 4B is a view showing the output waveform of an integrating amplifier shown in FIG. 4A;

FIG. 4C is a view showing modifications of a light receiving lens and a light receiving element shown in FIG. 4A;

FIG. 5 is a flow chart for explaining the operation of the electronic controlled camera of the first embodiment according to the present invention;

FIG. 8 is a block diagram showing the arrangement of the major components of an electronic controlled camera of the third embodiment according to the present invention;

FIG. 12 is a view for explaining the advantage of the electronic controlled camera of the fifth embodiment according to the present invention.

DETAILED DESCRIPTION OF THE PREFERRED EMBODIMENTS

Figure 2B:
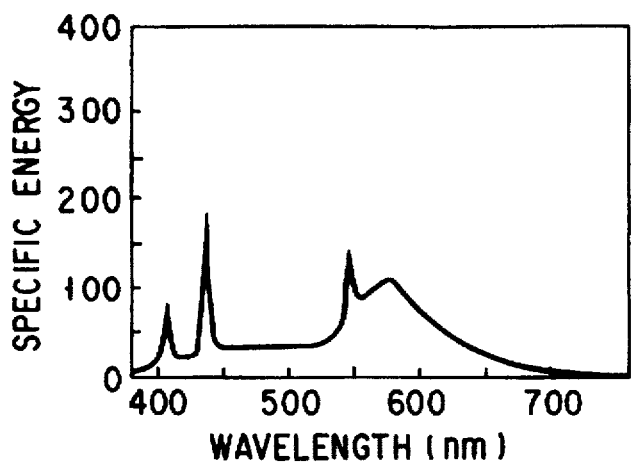

Reference will now be made in detail to the presently preferred embodiments of the invention illustrated in the accompanying drawings, in which like reference characters designate like or corresponding parts throughout the several drawings.

Prior to explaining the embodiments of the present invention, the concept of an electronic controlled camera according to the present invention will be described below in order to allow easy understanding of the invention.

FIG. 1 is a block diagram showing the conceptional arrangement of an electronic controlled camera according to the present invention.

The electronic controlled camera shown in FIG. 1 comprises an arithmetic control circuit (to be referred to as a CPU) 10, an infrared light photometric unit 12, a visible light photometric unit 14, an exposure controller 16, an electronic flash 18, an automatic focusing (AF) unit 20, a focusing unit 22, and a release switch 24. The CPU 10 controls the sequence of the whole camera and consists of, e.g., a one-chip microcomputer. The infrared light photometric unit 12 measures the infrared light component as the brightness of an object. The visible light photometric unit 14 measures the visible light component as the luminance of an object. The exposure controller 16 and the electronic flash 18 are controlled in accordance with the output from the visible light photometric unit 14. The AF unit 20 finds the distance (object distance) to an object. The focusing unit 22 performs focusing in accordance with the object distance obtained by the AF unit 20. A user uses the release switch 24 to designate the start of photographing.

As the infrared light photometric unit 12, a remote control sensor or an automatic focusing sensor of the camera can be directly used. As the visible light photometric unit 14, a photometric unit for exposure control can be directly used.

The operation of the electronic controlled camera with the above arrangement is as follows.

When the user operates a release switch button (not shown), the release switch 24 is closed.

The CPU 10 detects this closing timing of the release switch 24, and the AF unit 20 finds the object distance.

Also, the CPU 10 compares the output from the infrared light photometric unit 12 with the output from the visible light photometric unit 14 and checks whether the emission of light from the electronic flash 18 is necessary to aid exposure.

The CPU 10 causes the focusing unit 22 to perform focusing in accordance with the object distance. The CPU 10 causes the electronic flash 18 to emit light, if the emission of light from the electronic flash 18 is necessary, and performs exposure by using the exposure controller 16.

That is, the CPU 10 compares the outputs from the infrared light photometric unit 12 and the visible light photometric unit 14 and performs, as processing of correcting the color balance, a control operation of, e.g., making the electronic flash 18 emit light, writing color correction information, or, if the camera is an electronic still camera, adjusting an automatic white balance device.

FIGS. 2A and 2B are graphs showing the spectral distribution of sunlight and the spectral distribution of a fluorescent lamp, respectively.

The characteristic features of these spectral distributions are that the sunlight has a smooth distribution of components up to the infrared region as shown in FIG. 2A, whereas the fluorescence abruptly decays in the wavelength region longer than 600 nm as shown in FIG. 2B.

This characteristic of a fluorescent lamp is the cause of the color fog phenomenon described previously and is also the principle of light source detection in the present invention.

Figure 3:
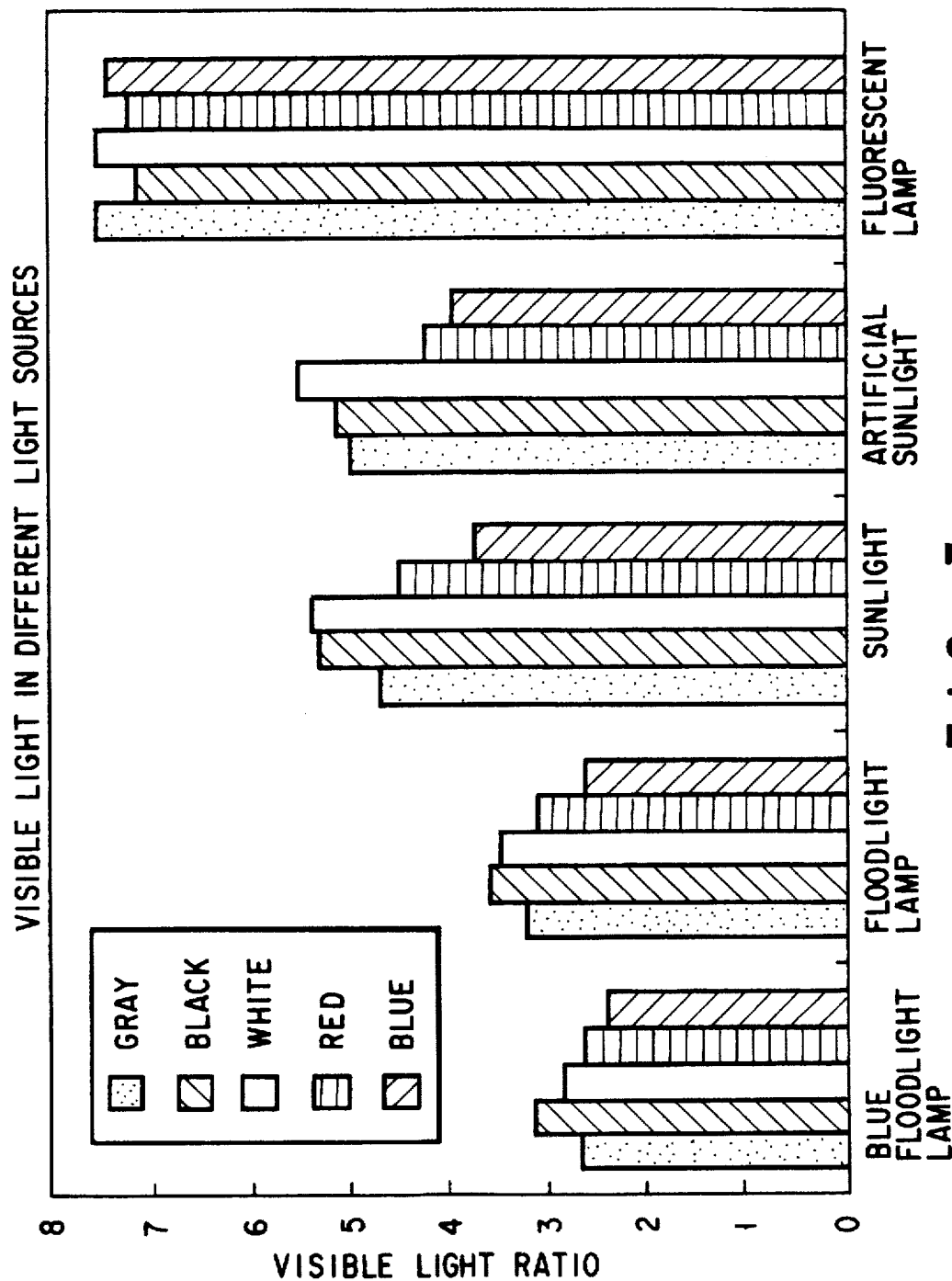
FIG. 3 is a graph showing the ratio of visible light to the sum of infrared light and the visible light for each of different light sources.

FIG. 3 is a graph showing the ratio of the visible light component to the sum of the infrared and the visible light component obtained when the visible and the infrared light components of each of different light sources were checked by using the electronic controlled camera according to the present invention.

FIG. 3 shows the results when the measurements were performed for five types of charts different in color. It is evident from FIG. 3 that the ratio of the visible light component to the sum of the infrared and the visible light components is independent of the color of the chart, i.e., depends only upon the type of light source.

For example, the comparison of sunlight and a fluorescent lamp shows that the infrared light component and the visible light component are about half and half in the sunlight and the visible light component accounts for 70% or more of the fluorescence.

An electronic controlled camera of the first embodiment according to the present invention will be described below.

FIG. 4A is a circuit diagram showing the main components of the electronic controlled camera of the first embodiment according to the present invention.

In FIG. 4A, light guided to a light receiving element 32 by a light receiving lens 30 provided in the infrared light photometric unit 12 is converted into a photocurrent by the light receiving element 32.

The photocurrent from the light receiving element 32 is supplied to one input terminal of an integrating amplifier 34 as a voltage converter and integrated by a capacitor 36 provided in the feedback loop of the integrating amplifier 34.

A switch 38 provided in the feedback loop of the integrating amplifier 34 is used to initialize the capacitor 36 prior to the integrating operation. The switch 38 is controlled by a control signal SW from the CPU 10.

A reference voltage Vref1 is applied to the other input terminal of the integrating amplifier 34, and the output voltage from the integrating amplifier 34 is supplied to one input terminal of a comparator 40.

A reference voltage Vref2 is applied to the other input terminal of the comparator 40, and an output COMP from the comparator 40 is supplied to one input terminal of the CPU 10.

That is, in the infrared light photometric unit 12 with the above arrangement, when the switch 38 is turned off by a fall of the control signal SW from the CPU 10, the output COMP from the comparator 40 is inverted when an output Vint from the integrating amplifier 34 drops from the reference voltage Vref1 and reaches the reference voltage Vref2, as shown in FIG. 4B.

A time Tint from the turning off of the switch 38 to the inversion of the output COMP from the comparator 40 is proportional to the reciprocal of the intensity of light entering the light receiving element 32.

A visible light cut filter 42 is arranged in the optical path between the light receiving lens 30 and the light receiving element 32. Consequently, only an infrared light component enters the light receiving element 32, and so the time Tint serves as an amount indicating the intensity of the infrared light component.

Accordingly, the CPU 10 can measure the quantity of the infrared light component by counting the time Tint by using an internal counter.

The foregoing are the arrangement and the operation of the infrared light photometric unit 12.

The arrangement of the visible light photometric unit 14 is identical with the arrangement of the infrared light photometric unit 12 except that an infrared cut filter 48 is arranged between a light receiving lens 44 and a light receiving element 46, and so a detailed description thereof will be omitted.

The CPU 10 compares the infrared light component with the visible light component of light reflected by an object.

To simplify the explanation, the light receiving lenses 30 and 44 and the light receiving elements 32 and 46 are illustrated as separate parts in FIG. 4A. However, as shown in FIG. 4C, a single light receiving lens 30 can be used instead of the two light receiving lenses 30 and 41, and the two light receiving elements 32 and 46 can be accommodated as a semiconductor monolithic split element in a common package 54.

If this is the case, the visible light cut filter 42 and the infrared cut filter 48 in the form of a film are adhered as a split filter on the surface of the package 54.

The operation of the electronic controlled camera of the first embodiment according to the present invention will be described below with reference to the flow chart in FIG. 5.

When the operation of this camera is started, the CPU 10 finds the infrared light component of light reflected by an object on the basis of the light quantity integrating time Tint of an infrared light photometric circuit 50, and sets the result as Tint1 (step S1).

Subsequently, the CPU 10 finds the visible light component of the light reflected by the object on the basis of the light quantity integrating time Tint of a visible light photometric circuit 52, and sets the result as Tint2 (step S2).

The CPU 10 then checks whether the infrared light component Tint1 is approximately equal to the visible light component Tint2 (step S3).

If the infrared light component Tint1 and the visible light component Tint2 are approximately equal to each other, the CPU 10 determines that the object is illuminated by sunlight and performs regular exposure control by assuming that there will be no problem in the color reproducibility when printing is performed after the photographing (step S5).

On the other hand, if the infrared light component Tint1 and the visible light component Tint2 are not nearly equal, the CPU 10 determines that the object is illuminated by artificial light. Accordingly, assuming that there will be a problem in the color reproducibility when printing is performed after the photographing, the CPU 10 performs exposure control by which the electronic flash 18 is made emit light, in order to adjust the tone of colors of prints (step S4).

In this manner the operation of this camera is completed.

An electronic controlled camera of the second embodiment according to the present invention will be described below.

Figure 6:
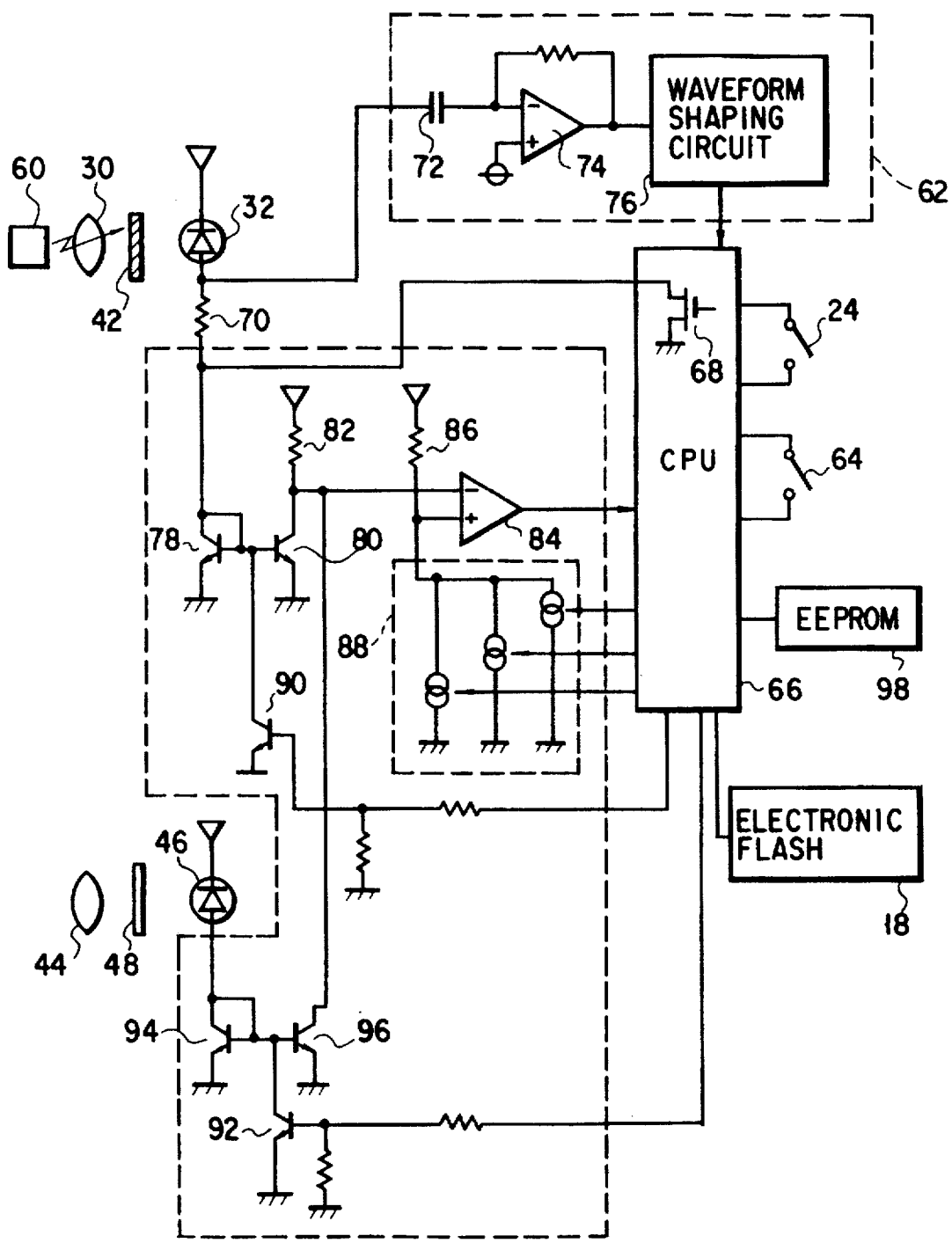
FIG. 6 is a circuit diagram showing the arrangement of the major components of an electronic controlled camera of the second embodiment according to the present invention.

FIG. 6 is a circuit diagram showing the arrangement of the main parts of the electronic controlled camera of the second embodiment according to the present invention.

In the electronic controlled camera of the second embodiment according to the present invention as shown in FIG. 6, a remote control sensor for remotely operating the camera is also used as a sensor for sensing infrared light as the characteristic feature of the present invention. This further simplifies the camera, decreases the cost of the camera, and saves the space in the camera.

When operated by the user, a remote control transmitter 60 emits infrared signal light so modulated as to be influenced by external light as hardly as possible.

When a remote control mode switch 64 is closed by the user, a remote control receiver circuit 62 is activated under the control of a CPU 66.

Consequently, a port 68 of the CPU 66 is grounded, a photocurrent from a light receiving element 32 is converted into a voltage by a resistor 70, and only an AC component is applied to an amplifier 74 by a capacitor 72.

That is, when the remote control transmitter 60 is operated, infrared light of a predetermined pulse is emitted to the light receiving element 32, and the output from the amplifier 74 is applied to a waveform shaping circuit 76.

The CPU 66 receives the output from the waveform shaping circuit 76, discriminates the signal from the remote control transmitter 60, and operates the camera.

In this embodiment, the light receiving element 32 for remote control is also used to detect the quantity of the infrared light component. When this is performed, the CPU 66 opens the port 68.

Consequently, the photocurrent from the light receiving element 32 is inverted by a current mirror circuit consisting of a pair of NPN transistors 78 and 80 and converted into a voltage signal by a resistor 82.

A comparator 84 compares this voltage signal with a reference voltage obtained by a resistor 86. Since a plurality of current sources 88 are connected to the resistor 86, reference voltages to the comparator 84 are switched when the CPU 66 switches these current sources.

In the course of gradually increasing the current value of the current source 88, the output from the comparator 84 is inverted when the reference voltage obtained by the resistor 86 equals the voltage signal obtained by converting the output current from the light receiving element 32. As a consequence, the CPU 66 detects the quantity of infrared light.

As described above, this embodiment uses successive comparison A/D conversion by which voltages are successively compared and analog amounts are converted into digital values.

The common base unit of the current mirror circuit is controlled by a transistor 90, and the transistor 80 is turned off when the transistor 90 is turned on.

When a transistor 92 is turned off at that time, a photocurrent from a light receiving element 46 for monitoring visible light is inverted by a current mirror circuit consisting of a pair of NPN transistors 94 and 96 and converted into a voltage signal by the resistor 82.

As in the case of the infrared light described above, the comparator 84 compares this voltage signal with the reference voltage obtained by the resistor 86. Since the plurality of current sources 88 are connected to the resistor 86, reference voltages to the comparator 84 are switched when the CPU 66 switches these current sources.

Also, as in the case of the infrared light described above, in the course of gradually increasing the current value of the current source 88, the output from the comparator 84 is inverted when the reference voltage obtained by the resistor 86 equals the voltage signal obtained by converting the output current from the light receiving element 32. As a consequence, the CPU 66 detects the quantity of visible light.

When both of the two transistors 90 and 92 are turned off, the photocurrents from the two light receiving elements 32 and 46 flow through the resistor 82. Consequently, the sum of the infrared light component and the visible light component is A/D-converted and evaluated.

This allows the CPU 66 to detect the quantity of the sum of the infrared light component and the visible light component.

Note that the characteristics of the light characteristics of light receiving lenses 30 and 44 vary in the manufacture, and these variations are different in different products. Accordingly, the light quantity ratio as shown in FIG. 3 must be so corrected as to cancel the difference.

To perform this correction, a correction coefficient K is stored in an electrically rewritable memory such as a nonvolatile memory (EEPROM) 98 when the camera is manufactured.

Also, in modes other than the remote control mode, a regular photographing operation is executed in accordance with the manipulation of the release switch 24.

Figure 7:
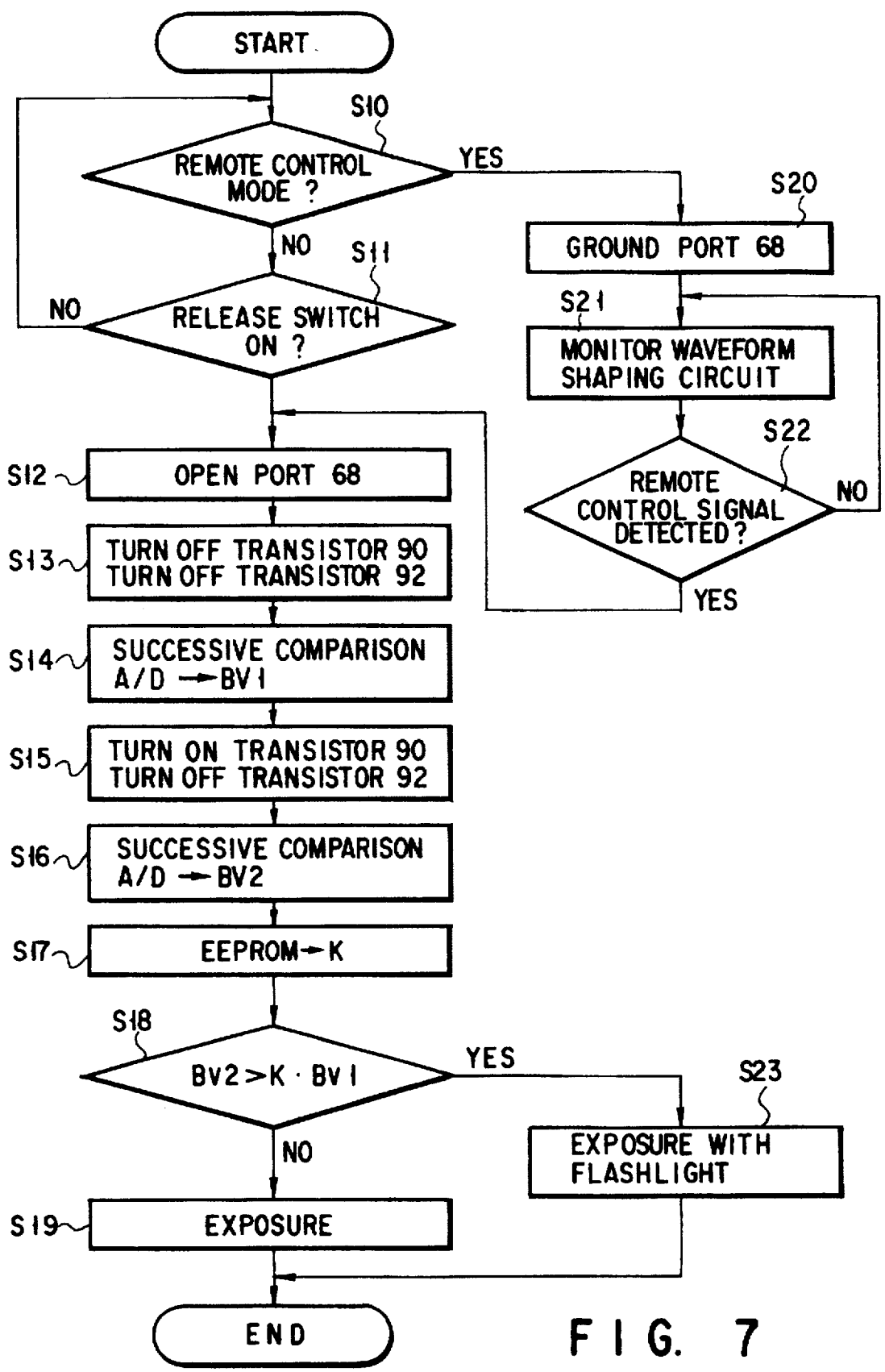
FIG. 7 is a flow chart for explaining the operation of the electronic controlled camera of the second embodiment according to the present invention.

The operation of the electronic controlled camera of the second embodiment according to the present invention will be described below with reference to the flow chart in FIG. 7.

When the operation of this camera is started, the CPU 66 detects the input state of the remote control mode switch 64 and checks whether the remote control mode is set (step S10).

If the remote control mode is set, the CPU 66 grounds the internal port 68 (step S20) and monitors the waveform shaping circuit 76 (step S21).

The CPU 66 checks whether the remote control signal from the remote control transmitter 60 is detected (step S22).

If the remote control signal is not detected, the CPU 66 returns to step S21 and repeats the processing from step S21.

If the remote control signal is detected, the CPU 66 jumps to processing in step S12.

If the remote control mode is not set in step S10, the CPU 66 checks whether the release switch 24 is ON (step S11).

If the release switch 24 is not ON, the CPU 66 returns to the processing in step S10 and repeats the processing from step S10.

If the release switch 24 is ON, the CPU 66 opens the internal port 68 (step S12) to allow the photocurrent from the light receiving element 32 for receiving infrared light to flow through the transistor 78, thereby setting the state in which A/D conversion is possible.

Subsequently, the CPU 66 turns off the transistors 90 and 92 (step S13) so that the output photocurrents from the two light receiving elements 32 and 46 are added, i.e., the photocurrents of the infrared light component and the visible light component are added, and the sum photocurrent flows through the resistor 82.

The CPU 66 then A/D-converts the sum photocurrent and stores the result of the A/D conversion as BV1 in an internal RAM (not shown) (step S14).

The CPU 66 turns on the transistor 90 and turns off the transistor 92 (step S15).

The CPU 66 A/D-converts the output from the light receiving element 46 for receiving visible light and stores the result of the A/D conversion as BV2 in the internal RAM (step S16).

Subsequently, the CPU 66 reads out the correction coefficient K from the EEPROM 98 (step S17).

The CPU 66 checks whether "BV2>K.BV1", thereby checking whether the illumination is a fluorescent lamp (step S18).

If "BV2>K.BV1", the CPU 66 determines that the object is illuminated by a fluorescent lamp. Accordingly, the CPU 66 makes the electronic flash 18 emit light to perform color correction in performing exposure while taking account of the influence of the fluorescent lamp, and also performs exposure control (step S23).

On the other hand, if "BV2>K.BV1" does not hold, the CPU 66 determines that there is no influence of a fluorescent lamp on the object. Therefore, the CPU 66 performs exposure control on the basis of the visible light photometry result BV2 obtained in step S16 (step S19).

In this manner the operation of this camera is completed.

Note that the correction coefficient K can be set to 0.6 when the characteristics of the light receiving elements 32 and 46 do not largely vary and the characteristics of the light receiving lenses 30 and 44 inherent in products do not largely vary, either.

An electronic controlled camera of the third embodiment according to the present invention will be described below.

FIG. 8 is a block diagram showing the arrangement of the major parts of the electronic controlled camera of the third embodiment.

This electronic controlled camera uses a light receiving element for automatic focusing (AF) as a sensor for sensing infrared light.

This is possible because a so-called active type distance measuring system in which a camera emits distance measurement light and detects the reflected signal light to find the luminance of an object generally uses infrared light as the distance measurement light.

As shown in FIG. 8, a CPU 100 causes an infrared light emitting diode (to be referred to as an IRED hereinafter) 104 to emit pulse light via a driver 102. The light is condensed by a light projecting lens 106 and projected onto an object 108.

This projected light is reflected by the object 108 and guided into a semiconductor light position sensitive device (to be referred to as a PSD hereinafter) 112 as the reflected light signal through a light receiving lens 110.

This PSD 112 is accommodated into a package having a visible light cut characteristic and outputs two current signals corresponding to the position of the reflected signal light from electrodes at the two ends.

Amplifiers 114 and 116 amplify these current signals.

Since the current signals contain a component based on the background light in addition to the reflected signal light, this component must be removed.

To this end, transistors 118 and 120 and resistors 122 and 124 are used to flow the background light component to ground.

This background light component is a DC component. Stationary light removing circuits 126 and 128 determine the base potentials of the transistors 118 and 120, and capacitors 130 and 132 hold these base potentials.

Consequently, the quantity of the infrared light from the object 108 is detected on the basis of the sum of the potentials obtained by a sum calculating circuit 134.

Also, on the basis of the ratio of the output current from the PSD 112, a ratio calculating circuit 136 calculates and outputs a signal corresponding to the incident position of the reflected signal light on the PSD 112.

The CPU 100 receives the output from the ratio calculating circuit 136, finds the incident position of the reflected signal light, and calculates the object distance on the basis of the principle of trigonometrical distance measurement.

The CPU 100 then performs focusing of the camera.

Also, an infrared cut filter 48 is arranged between a light receiving lens 44 and a light receiving element 46. Therefore, a visible light photometric circuit 52 receives only the visible light component and, as in the first embodiment shown in FIG. 4A, outputs an electrical signal corresponding to the quantity of the received visible light component to the CPU 100.

That is, the visible light photometric circuit 52 is a photometric circuit of this camera, and the CPU 100 determines the exposure value on the basis of the electrical signal.

In addition, a blue transmission filter 137 is arranged between a light receiving lens 30 and a light receiving element 32. Therefore, a blue light photometric circuit 50 receives only blue light and outputs an electrical signal corresponding to the received blue light to the CPU 100.

As described above, on the basis of the outputs from the sum calculating circuit 134, the visible light photometric circuit 52, and the blue light photometric circuit 50, the CPU 100 detects and compares the components of infrared light, visible light, and blue light contained in the light source illuminating the object 108, and thereby estimates the type of light source.

In the above first and second embodiments, it is only possible to distinguish between sunlight and a fluorescent lamp. However, the spectral distribution of a floodlight lamp shown in FIG. 2C has a larger amount of the infrared light component than those in the spectral distributions of sunlight and a fluorescent lamp shown in FIGS. 2A and 2B. Therefore, in the third embodiment described below it is possible by using this characteristic to distinguish between a floodlight lamp having the spectral distribution shown in FIG. 2C, sunlight, and a fluorescent lamp.

This is also apparent from the visible light ratios in different light sources shown in FIG. 3.

Note that in FIG. 3, the lower the visible light ratio the larger the amount of the infrared light component.

To correct the reddish color of a floodlight lamp, a blue floodlight lamp equipped with a blue filter is commercially available.

Since the light of this blue floodlight lamp is bluish although the lamp has a large amount of the infrared light component, it is necessary to increase red if color correction is to be performed.

That is, in the case of a fluorescent lamp it is possible to estimate that red is little because the amount of the infrared light component is small.

However, this estimation is unsatisfactory in the case of a blue floodlight lamp.

In this third embodiment, therefore, a blue light photometric circuit 50 is used to specify the type of lamp while taking the blue component into account if the amount of the infrared light component is large.

Figure 2C:
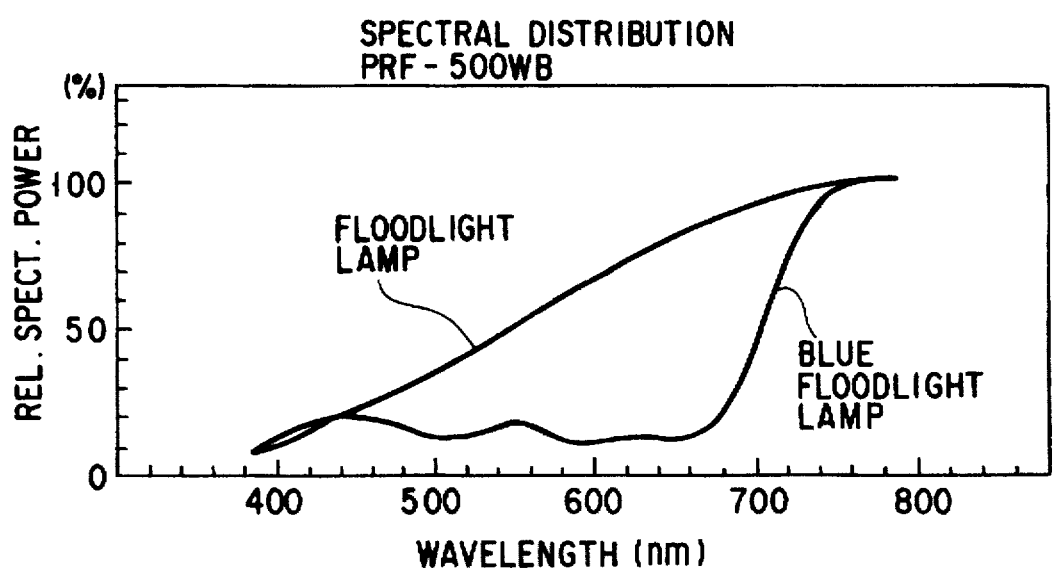

That is, the third embodiment makes use of the fact that a common floodlight lamp and a blue floodlight lamp are significantly different from each other in the blue component as shown in FIG. 2C.

Note that if it is determined that unbalanced color reproduction can occur when printing is performed after photographing, an electronic flash emits light in the above first and second embodiments. In this third embodiment, however, a writing means, e.g., a magnetic or optical recording unit 138 writes color correction information in a film 140 or a film carrier 140a having a magnetic or optical recording medium.

Also, an automatic printer having a function of reading out the recorded data from the film is given an instruction which indicates switching between the degrees of color correction during printing for the corresponding frame in the film.

That is, color correction is performed such that red is suppressed when photography is performed under a general floodlight lamp and blue is suppressed when photography is performed under a fluorescent lamp or a blue floodlight lamp.

When photography is performed under a blue floodlight lamp, no color correction needs to be performed since the light of the lamp is very close to natural light.

When it is determined that the object is illuminated by a general floodlight lamp or a fluorescent lamp, it is also possible to make an electronic flash 18 emit light to correct the color balance in the same manner as in the first and second embodiments.

In a camera having as a distance measuring means a so-called active type multi-point distance measuring device capable of measuring the distances to a plurality of points in the frame, it is also possible to determine the position of a principal object from the distribution of the measured distances and write the measured light value of the principal object on a film.

In the third embodiment, cameras for silver halide photographic films have been described. In the case of electronic still cameras, however, it is only necessary to perform all white balance control on the basis of color correction information.

Figure 9:
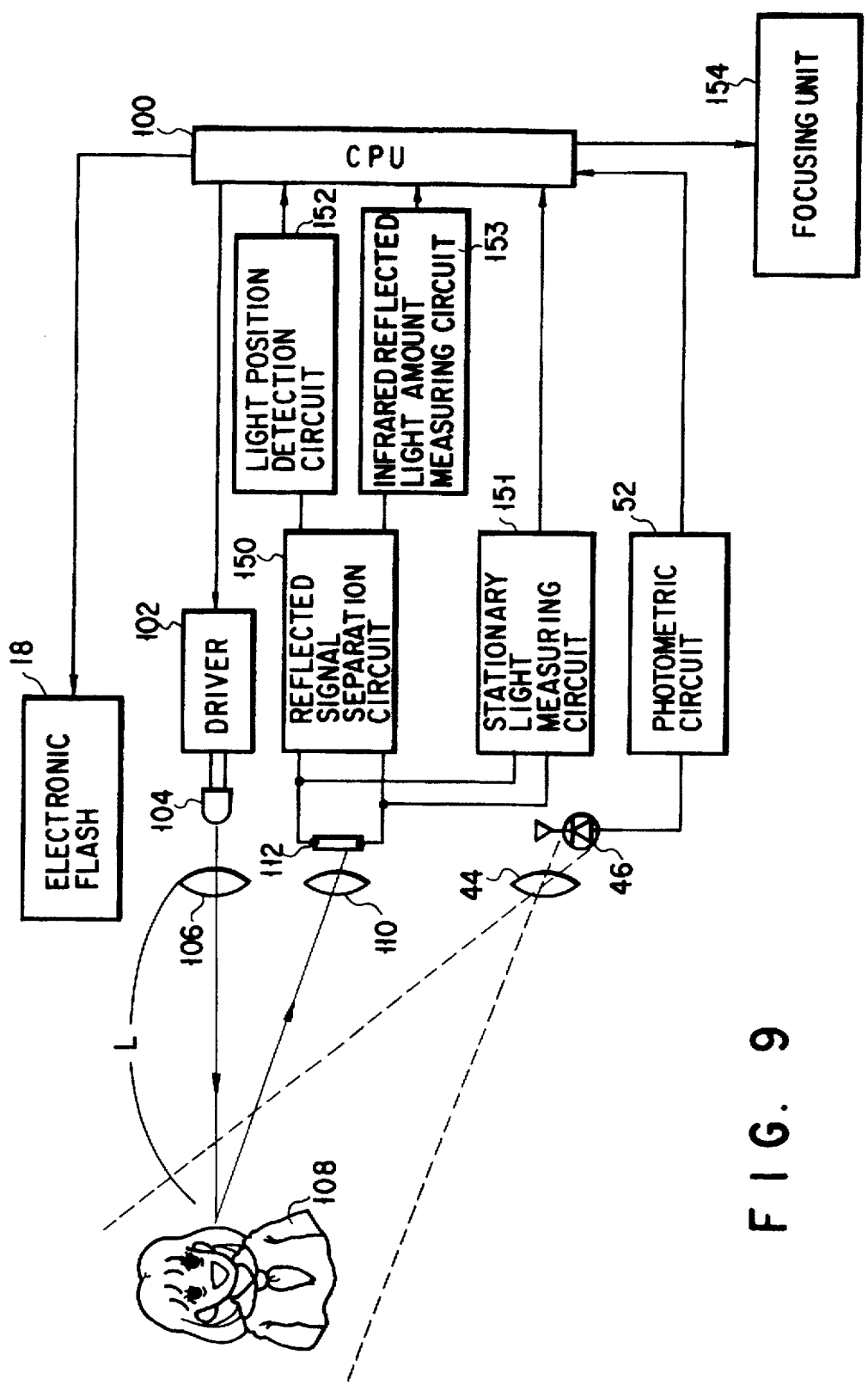
FIG. 9 is a block diagram showing the arrangement of the major components of an electronic controlled camera of the fourth embodiment according to the present invention.

FIG. 9 shows the arrangement of the fourth embodiment of the present invention.

As in the third embodiment shown in FIG. 8, in this embodiment infrared light is measured by using a so-called active type distance measuring device of infrared projection type.

The measurement of infrared light is similar to that explained previously in the third embodiment.

That is, a stationary light measuring circuit 151 measures the quantity of stationary light entering a PSD 112 using an AF light receiving element.

A reflected signal separation circuit 150 separates, from the stationary light, the pulse photo current component based on the reflected signal light of light projected onto an object 108 by an IRED 104 through a light projecting lens 106, and applies the separated component to a light position detection circuit 152 for distance measurement and an infrared reflected light amount measuring circuit 153 to be described later.

Note that the IRED 104 is controlled by a CPU 100 via a driver 102.

The characteristic feature of this embodiment is that more reliable exposure control is performed by measuring the reflected signal amount from the object 108 by using the projected infrared light for distance measurement from the IRED 104.

On the other hand, the visible light component is measured by measuring the quantity of light entering a visible light component sensor 46 by using a photometric circuit 52.

This can be the same as those generally used in exposure control.

In accordance with the outputs from the stationary light measuring circuit 151, the light position detection circuit 152, the infrared reflected light amount measuring circuit 153, and the photometric circuit 52, the CPU 100 focuses a photographing lens (not shown) by using a focusing means 154 or performs exposure control by using an electronic flash 18.

Figure 10:
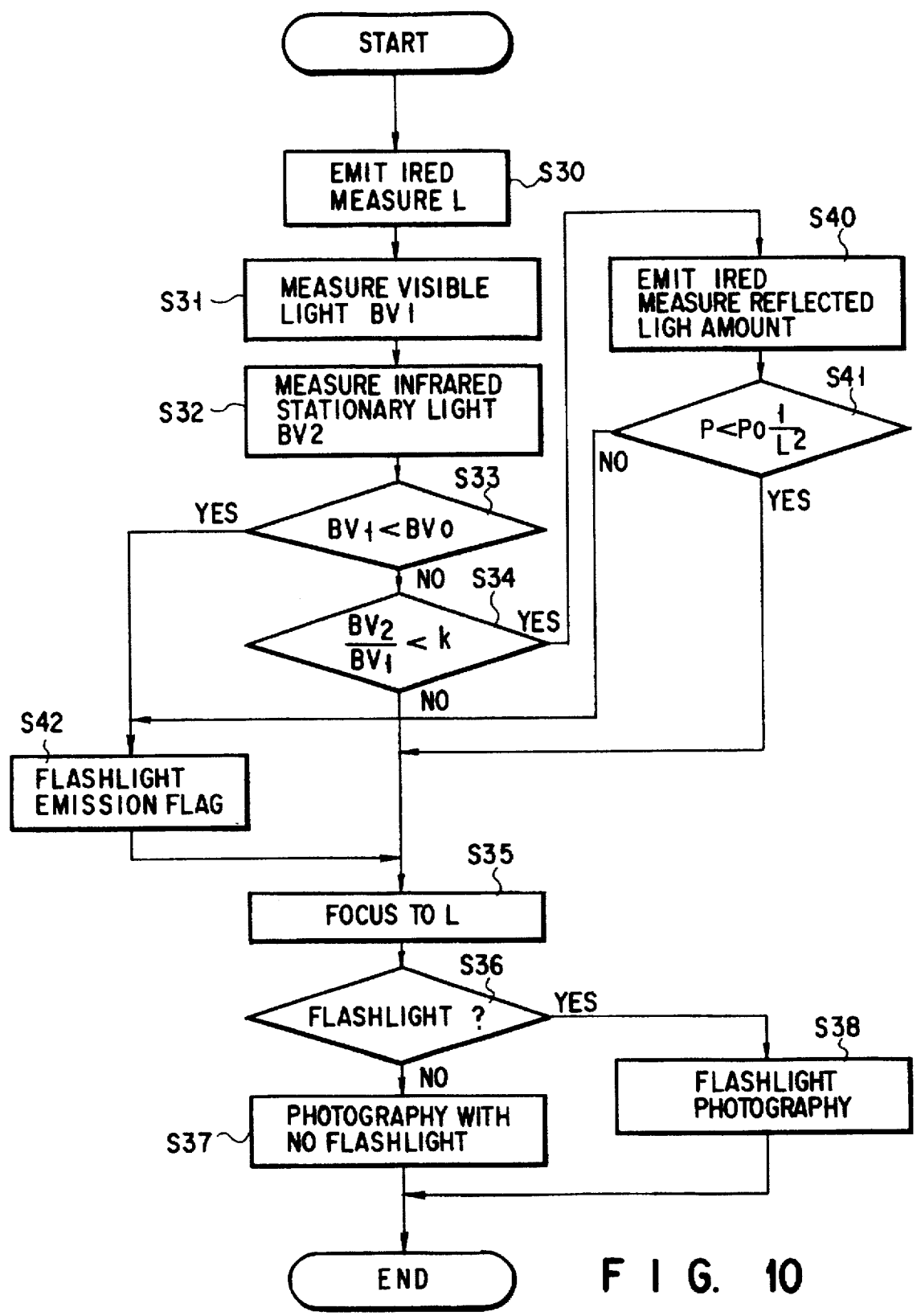
FIG. 10 is a flow chart for explaining the operation of the electronic controlled camera of the fourth embodiment according to the present invention.

The operation of the embodiment with the above arrangement will be described in detail below with reference to the flow chart in FIG. 10.

In step S30, the CPU 100 causes the IRED 104 to project infrared light for distance measurement via the driver 102 and finds the position of the reflected signal light from the object 108 by using the PSD 112 and the light position detection circuit 152. On the basis of the light position found, the CPU 100 finds an object distance L and stores it in an internal RAM (not shown).

In step S31, the CPU 100 measures the visible light component on the basis of the output from the photometric circuit 52 and stores the result as a visible light measured amount BV1 in the internal RAM.

In step S32, the CPU 100 finds the stationary light component containing infrared light on the basis of the output obtained from the stationary light measuring circuit 151 via the PSD 112 when the IRED 104 emits no light. The CPU 100 stores the result as an infrared light measured amount BV2 in the internal RAM.

On the basis of these measured light values, the CPU 100 checks whether the photographic scene meets the conditions of flashlight emission.

First, in step S33 the CPU 100 compares the visible light measured value BV1 with a predetermined luminance value BV0 and checks whether the object is dark.

If the CPU 100 determines that the object is dark, in step S42 the CPU 100 sets a flashlight emission flag and performs flashlight photographing in the same manner as many cameras do.

In step S34, the CPU 100 calculates the ratio of the infrared light measured amount BV2 to the visible light measured amount BV1 and compares the ratio with a predetermined value k. If the ratio of the infrared light is lower, the CPU 100 determines that the object is likely to be illuminated by light other than natural light, and so the flow branches to processing in step S40.

In this case the CPU 100 makes the electronic flash emit light and thereby improves the color reproducibility of a photograph. In other cases, the flow branches to processing in step S35.

Even when the flow branches to step S40, however, it is possible that the object is illuminated by natural light.

This is when the object 108 has high absorbance for infrared light, and in this case no flashlight is necessary. Accordingly, the CPU 100 checks the object 108 of this sort in step S40.

That is, in step S40 the CPU 100 projects the infrared light for distance measurement from the IRED 104, receives the reflected signal light from the object 108 by using the PSD 112, and measures a reflected light amount P.

The result is proportional to the product of the reflectance of the object and the reciprocal of the square of the distance to the object.

Since the object distance L is already determined, the CPU 100 uses a value P0 assuming a predetermined reflectance and checks in step S41 whether the infrared reflectance of the object is high by using an expression such as $P < P0 \times 1/L^2$.

When the infrared reflectance of the object is high, P increases and it is considered that the infrared absorbance is low.

That is, P is small when the object has high infrared absorbance. If P of the object is small, therefore, it is highly possible that the flow branches from step S34 to step S40 even when the object is illuminated by natural light.

Since in this case no flashlight is necessary, the CPU 100 branches the flow from step S41 to the processing in step S35.

In contrast, even when the infrared reflectance is satisfactory (P is large), if the flow branches from step S34 to step S40, the CPU 100 determines that the color balance of the illuminating light source is lost. Accordingly, to make the electronic flash emit light, the CPU 100 branches the flow from step S41 to the processing in step S42 and sets the flashlight emission flag.

The CPU 100 focuses the camera on the object distance L in step S35 and detects the flashlight emission flag in step S36. In accordance with the detection result, the flow branches to step S37 or S38.

That is, if the flashlight emission flag is H in step S36, the CPU 100 performs flashlight photographing in step S38. If the flashlight emission flag is L in step S36, the CPU 100 performs photographing with no flashlight in step S37.

In this embodiment as described above, the camera emits the reference signal light, the reflectance is calculated from the reflected light quantity and the object distance, and this reflectance is also used in exposure control. Accordingly, even when the object has high absorbance for infrared light, it is possible to accurately detect that the object is illuminated by natural light or artificial light lacking color balance. Since this prevents flashlight emission from being unnecessarily performed, energy savings can be accomplished.

Figure 11:
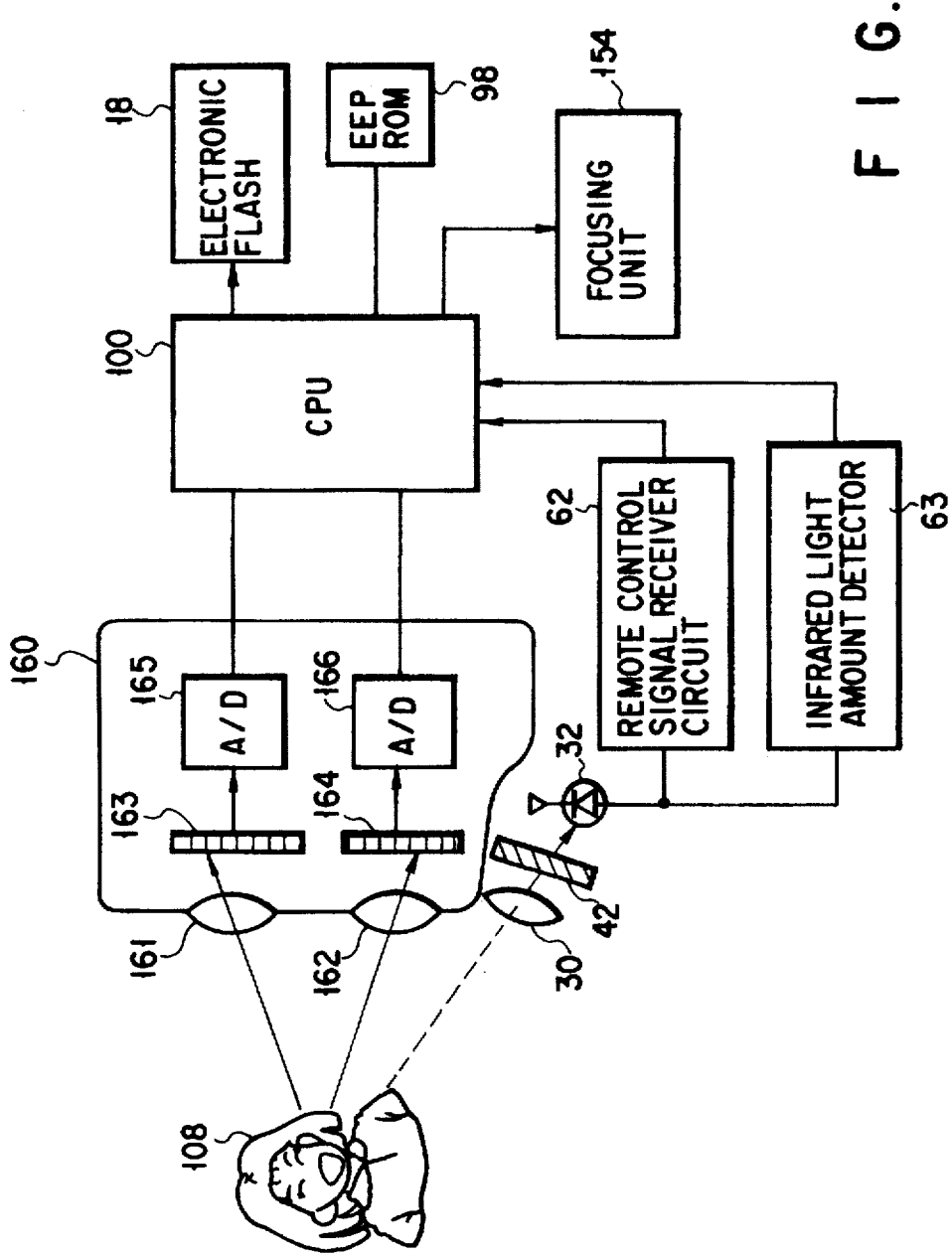
FIG. 11 is a block diagram showing the arrangement of the major components of an electronic controlled camera of the fifth embodiment according to the present invention.

FIG. 11 shows the fifth embodiment of the present invention.

This fifth embodiment uses a so-called passive type distance measuring device 160 to detect visible light.

Passive type AF detects luminance distribution information of an object 108 through lenses 161 and 162 having parallax and finds the object distance from the luminance distribution information. This luminance distribution information is applied from sensor arrays 163 and 164 to a CPU 100 via A/D converters 165 and 166.

The CPU 100 finds the correlation from the luminance distribution information and calculates the object distance from the difference by using a trigonometrical distance measurement expression.

In this embodiment the AF sensor array having the above function is used as a visible light photometric means.

On the other hand, an infrared light component can be detected by a remote control sensor 32.

The advantage of this embodiment will be described below with reference to FIG. 12.

As shown in FIG. 12, the region monitored by the remote control sensor 32 for infrared light photometry differs from the region monitored by the sensor array 163 for visible light photometry in accordance with the distance.

At a distance L1, the remote control sensor 32 for infrared light photometry monitors a region 32a which is equivalent to the region monitored by a portion Sa of the sensor array 163 for visible light photometry.

At a distance L2, the remote control sensor 32 for infrared light photometry monitors a region 32b which is monitored by a portion Sb, different from the portion Sa, of the sensor array 32 for visible light photometry.

Note that a region 163a is monitored by the whole sensor array 163 for visible light photometry.

If parallax like this exists, a light source illuminating an object cannot be accurately detected.

This is so because the present invention detects the color balance of illumination from the wavelength difference between light components on the same object. Accordingly, if portions monitored by sensors have different color tones, the influence of the color difference is no longer negligible.

When the present invention is viewed from this point, the detection regions of the AF sensor array 163 can be switched. Therefore, by switching the visible light component detection ranges in accordance with the object distance, it is possible to perform more precise light source detection free of the influence of the parallax described above.

More specifically, it is only necessary to switch the operation regions of the sensor array 163, when the visible light component is evaluated, in accordance with the result of distance measurement from the CPU 100.

As described above, this embodiment can perform more precise light source detection free of the influence of parallax.

In each of the above embodiments as has been described above, a light source illuminating an object can be detected with a simple arrangement by using a photometric means or an infrared light sensor which cameras conventionally include. Accordingly, on the basis of this detection result of the light source, it is only necessary to change flashlight emission control taking account of the color reproducibility when printing is performed after the photographing. That is, a camera capable of providing printed photographs with a high reproducibility can be provided with a simple arrangement and a low cost.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An electronic controlled camera comprising:

an ambient light measuring device for measuring ambient light illuminating an object, said ambient light measuring device having a first photometric unit for measuring a visible light component of the ambient light and a second photometric unit for measuring an infrared light component of the ambient light;

a processing unit for determining a ratio between the visible light component measured by said first photometric unit and the infrared light component measured by said second photometric unit; and an electronic flash for illuminating the object;

wherein said processing unit determines whether to operate said electronic flash to emit light at a time of exposure based on said ratio between the visible light component measured by said first photometric unit and the infrared light component measured by said second photometric unit.

2. The camera according to claim 1, wherein said first photometric unit provides an output used for performing exposure control of said camera.

3.. The camera according to claim 1, wherein said second photometric unit comprises a light receiving unit for receiving infrared light from a remote controller for remotely controlling said camera.

4. The camera according to claim 1, wherein said second photometric unit comprises a light receiving element of an active distance measuring device which measures a distance to the object.

5. The camera according to claim 1, wherein said first photometric unit comprises an infrared cut filter arranged before a photometric element.

6. The camera according to claim 1, wherein said second photometric unit comprises a visible light cut filter arranged before a photometric element.

7. The camera according to claim 1, further comprising a third photometric unit for measuring a blue component of the ambient light of the object, and wherein said processing unit determines whether to operate said electronic flash to emit light at the time of exposure taking into account the blue component measured by said third photometric unit.

8. The camera according to claim 1, further comprising a recording unit for recording color correction information on a film based on a determination result of said processing unit.

9. The camera according to claim 8, wherein said recording unit performs one of magnetic recording on a magnetic recording medium provided on said film and optical recording on said film.

10. An electronic controlled camera comprising:

an ambient light measuring unit for measuring a first wavelength component and a second wavelength component of ambient light illuminating an object;

an electronic flash for illuminating the object; and a processing unit for determining whether to operate said electronic flash to emit light at a time of exposure based on a ratio of the first wavelength component to the second wavelength component measured by said ambient light measuring unit.

11. The camera according to claim 10, further comprising a recording unit for recording color correction information on one of a recording portion of a film and a film carrier, in accordance with the ratio of the first wavelength component to the second wavelength component measured by said ambient light measuring unit.

12. The camera according to claim 10, wherein said ambient light measuring unit comprises a photoelectric conversion element for at least one of remote control signal reception and object distance determination.

13. The camera according to claim 12, wherein said photoelectric conversion element projects distance measurement light toward the object, receives reflected light from the object, and detects a light reception position.

14. The camera according to claim 12, wherein said ambient light unit comprises two photoelectric conversion elements arranged in two different positions for detecting a phase difference between images of the object.

15. The camera according to claim 14, wherein said photoelectric conversion elements comprise line sensors.

16. The camera according to claim 10, wherein said ambient light unit comprises a photoelectric conversion element for receiving at least one of signal light from a remote controller of said camera and distance measurement light for object distance determination, and wherein said ambient light unit detects a stationary light component from said photoelectric conversion element when detecting the first and second wavelength components of the ambient light illuminating the object, and detects a pulse light component of said photoelectric conversion element when detecting one of the signal light and the distance measurement light.

* * * * *